Feb. 15, 1944. Z. O. ST. PALLEY 2,341,958
REGULATING TRANSFORMER
Original Filed Jan. 28, 1942   2 Sheets-Sheet 1

Inventor:
Zoltan O. St. Palley,
by Harry E. Dunham
His Attorney.

Feb. 15, 1944.                Z. O. ST. PALLEY                 2,341,958
                          REGULATING TRANSFORMER
                  Original Filed Jan. 28, 1942    2 Sheets-Sheet 2

Inventor:
Zoltan O. St. Palley,
by Harry E. Dunham
His Attorney.

Patented Feb. 15, 1944

2,341,958

UNITED STATES PATENT OFFICE 2,341,958

REGULATING TRANSFORMER

Zoltan O. St. Palley, Pittsfield, Mass., assignor to General Electric Company, a corporation of New York Original application January 28, 1942, Serial No. 428,479. Divided and this application August 1, 1942, Serial No. 453,227

8 Claims. (Cl. 171—119)

This invention relates to electrical regulating transformers and more particularly to improvements in alternating current voltage regulating transformers of the variable ratio type.

This is a division of my application S. N. 428,479, filed January 28, 1942 (now Patent No. 2,329,229), and assigned to the assignee of the present application.

Voltage regulating transformers of the type in which the relative magnitude of two quadrature related voltage components may be adjusted are old in the art. Such arrangements are often used for inter-connecting two alternating current power circuits, in which case one of the voltage components is usually in phase with the voltage of one of the circuits and the other component is therefore in quadrature therewith. The relative adjustment of these components makes it possible to adjust the active and reactive volt-amperes in the circuit when such interconnection closes a loop circuit.

In accordance with this invention there is provided a novel arrangement of three transformer windings per phase for providing the desired quadrature related voltage components. For polyphase application it is not necessary to have three times as many separate windings as there are phases and an arrangement of six windings may conveniently constitute the secondary winding of a three-phase transformer to which the conductors of a three-phase circuit may be connected. When the transformer is an exciting transformer this three-phase circuit is particularly adapted to energize a delta-connected primary winding of a series transformer whose secondary winding is connected in the main power circuit or which may be considered as interconnecting two main power circuits.

An object of the invention is to provide a new and improved regulating transformer.

Another object of the invention is to provide an in-phase and quadrature voltage control regulating transformer which is characterized by a novel and simple arrangement of transformer windings.

The invention will be better understood from the following description taken in connection with the accompanying drawings and its nection with the accompanying drawings and its scope will be pointed out in the appended claims.

Figure 1:
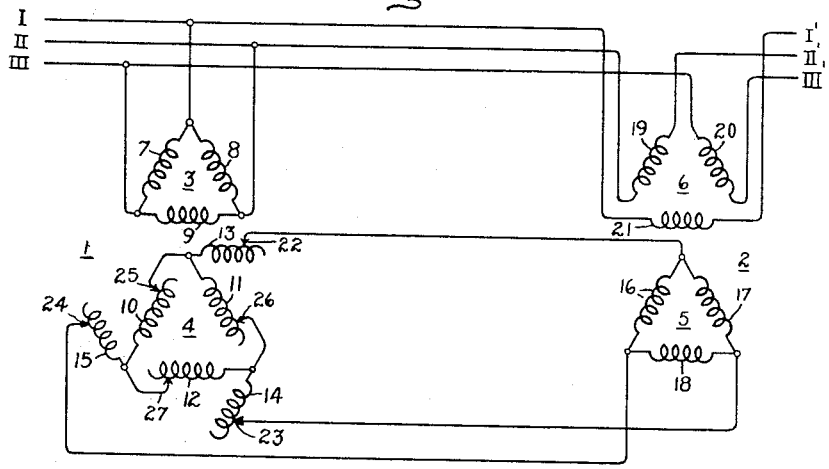
Figure 2:
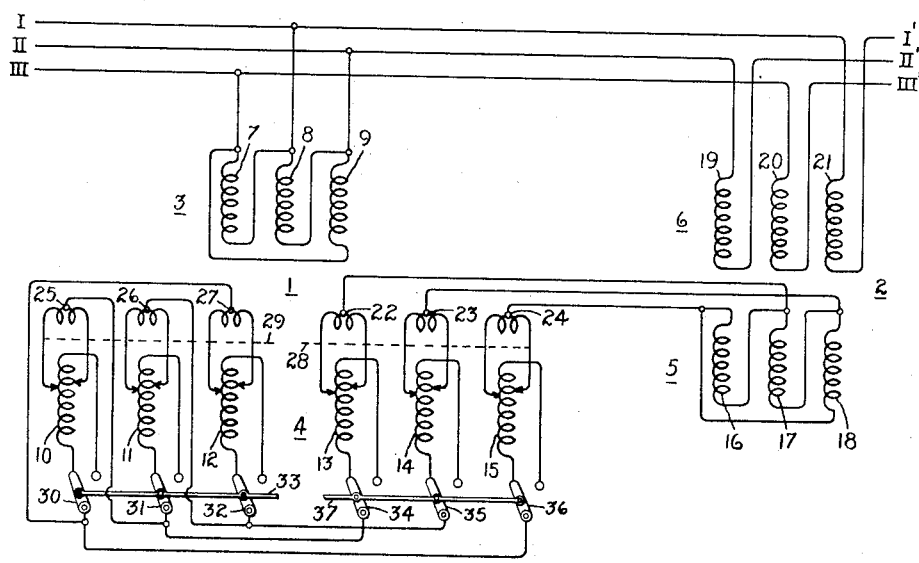
Figure 3:
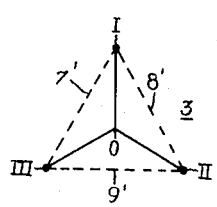
Figure 4:
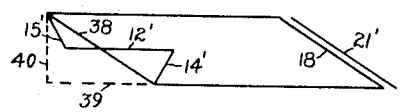
Figure 5:
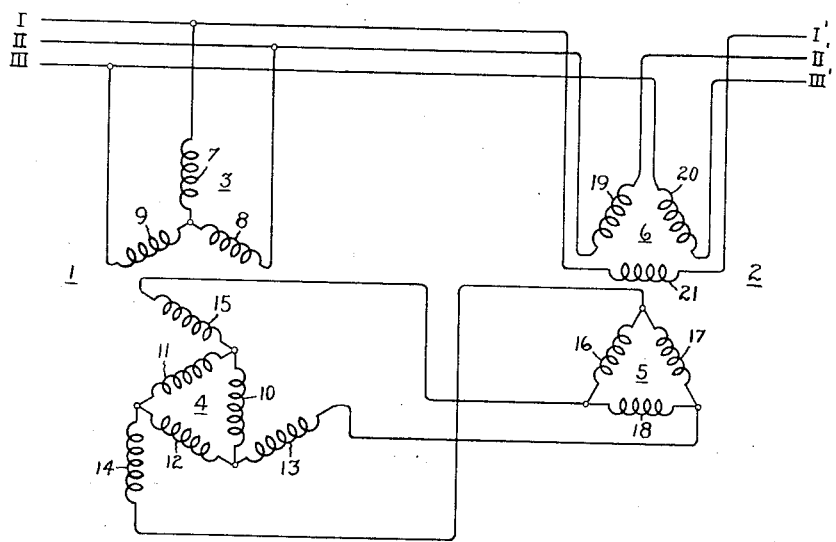
Figure 6:
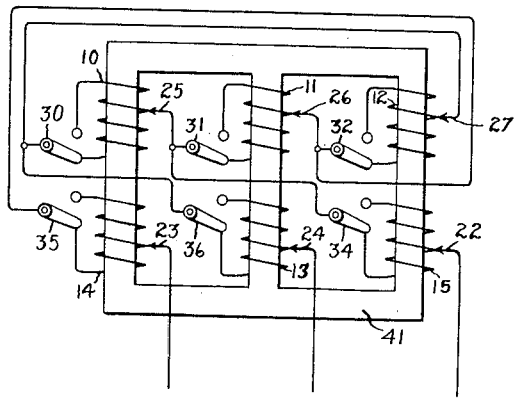

In the drawings Fig. 1 illustrates diagrammatically an embodiment of the invention in which the transformer windings are laid out so as to show the phase relations of their voltages, Fig. 2 shows the circuit of Fig. 1 with the windings arranged in conventional manner and with the addition of polarity reversing switches and modified tap-changing means, Fig. 3 is a vector diagram showing the relation between the line-to-line and line-to-neutral voltages of the exciting circuit and the phase voltages of the primary winding of the exciting transformer, Fig. 4 is a vector diagram of the voltages of one phase of the secondary winding of the exciting transformer and of the primary and secondary voltages of the corresponding phase of the series transformer, Fig. 5 is a modification similar to Fig. 1 but showing a star-connected primary winding for the exciting transformer, and Fig. 6 shows the physical arrangement of the regulating windings.

Referring now to the drawings and more particularly to Fig. 1, there is shown therein a pair of main three-phase power circuits having phase conductors I, II and III and I', II' and III' respectively. The voltage between these circuits is regulated by a transformer system comprising an exciting transformer 1 and a series transformer 2. The exciting transformer has a primary winding 3 connected across the main circuit I, II and III and has a secondary winding 4 consisting of two sets of three phase windings. The series transformer has a delta-connected primary winding 5 which is excited by the secondary winding 4 of the exciting transformer and which in turn excites a secondary winding 6 whose phase windings interconnect the corresponding phase conductors of the two main power circuits.

The individual phase windings of the primary winding 3 of the exciting transformer are designated as 7, 8 and 9 and three of the corresponding secondary phase windings, designated as 10, 11 and 12, are also delta connected. Each of the remaining secondary phase windings 13, 14 and 15 are connected respectively to the corner of the delta formed by the two phase windings thereof which are out of phase with said remaining winding. In other words, winding 13 is connected to the corner formed by the interconnection of 10 and 11, winding 14 is connected to the corner of the delta formed by the connection of windings 11 and 12, etc. The output of the secondary winding 4 is derived from corresponding points on the windings 13, 14 and 15 and these points are connected to the corners of the delta primary winding 5 of the series transformer. As shown, this delta winding comprises the phase windings 16, 17 and 18 which excite respectively the phase windings 19, 20 and 21 of the secondary winding 6 of the exciting transformer.

By means of this connection it will be seen that each phase winding of the primary winding 5 is excited by three series voltages. One of these voltages is the voltage of one of the phase windings of the three delta-connected secondary windings 10, 11 and 12, the remaining two voltages being the voltages of two of the windings 13, 14 and 15. For example, the primary phase winding 18 of the series transformer is excited by the voltages of the windings 15, 12 and 14 in series. As can be seen from the drawings and as will be explained more fully hereafter, the resultant of the voltages of windings 14 and 15 is in quadrature with the voltage of the winding 12 so that if the voltages of the windings 14 and 15 are adjusted simultaneously so as to maintain equality between them for different values thereof the magnitude of their resultant voltage, which is in quadrature with the voltage of winding 12, will be varied relative to the latter. The effective voltages of the windings 13, 14 and 15 may conveniently be adjusted by means of tap changers or load ratio control mechanisms 22, 23 and 24 respectively. Similarly, the effective voltages of the delta-connected secondary phase windings 10, 11 and 12 may be adjusted by means of similar mechanisms 25, 26 and 27 respectively.

As previously stated, Fig. 2 shows the same electrical connections between the windings as in Fig. 1 but the windings are arranged diagrammatically in conventional manner instead of for showing the phase relations of their respective voltages. In addition, a more detailed showing has been made of a particular form of tap changer which is suitable for use in the circuit. This tap changer consists of a double movable contact finger arrangement which is connected to the circuit or adjustable load of the winding by means of a mid-tapped reactor for controlling circulating current when the fingers are on different voltage taps. This is a well-known arrangement and permits the changing of taps without opening the winding circuit.

For convenience of operation, the individual tap changers 22, 23 and 24 are provided with a common operating mechanism which may be of any well-known type and which is shown schematically and designated as 28. Similarly, the three tap changers 25, 26 and 27 for the delta phase windings 10, 11 and 12 have a common operating mechanism 29.

For increasing the range of control or adjustment of the system means is provided for reversing the phase of the effective voltages of windings 10, 11 and 12 on the one hand and of windings 13, 14 and 15 on the other hand. In the case of the windings 10, 11 and 12 this reversing means may consist of separate reversing switches 30, 31 and 32 interconnected by a common operating member 33 and similarly this reversing means for the windings 13, 14 and 15 may consist of reversing switches 34, 35 and 36 interconnected by a common operating member 37.

The operation of Figs. 1 and 2 may best be understood by reference to Figs. 3 and 4. In Fig. 3 the dots I, II and III may be taken to represent in cross section the phase conductors of the power circuit across which the primary winding 3 of the exciting transformer 1 is connected. The voltages of the phase windings of this delta-connected winding are designated as 7', 8' and 9' while the neutral point of the system is shown as 0 and the line-to-neutral voltages are represented by the vectors connecting the netural point 0 with the phase conductors I, II and III.

Fig. 4 shows the vector relations between the voltages of the phase of the secondary winding 6 of the exciting transformer which excites the phase winding 18 of the primary winding of the series transformer. In this figure the vector 12' represents the voltage of the phase winding 12 which, as will be seen by comparison with Fig. 3, is in phase with the voltage 9' corresponding to the voltage of the primary phase winding 9. This voltage is at right angles to the line-to-neutral or phase voltage of the conductor I. The vectors 15' and 14' represent the voltages of the windings 14 and 15. The vector resultant of the three voltages 15', 14' and 12' is the vector 38. This vector in turn may be thought of or resolved into two quadrature components 39 and 40. Component 39 is equal in magnitude to 12' and is in quadrature with the line-to-netural voltage of conductor I. Component 40 is equal to the vector difference between 15' and 14' and is in phase with the line-to-netural voltage of conductor I. The voltage of the phase 18 of the primary winding 5 of the series transformer is the same as the resultant voltage 38 because that is the voltage which is impressed across this winding. Consequently, the voltage of the corresponding phase 21 of the secondary winding of the series transformer is in phase with the vector 38 and as is shown the phase winding 21 is connected in series with the conductor 15. Consequently, there is inserted in series with the conductor I a voltage having a component in phase with its phase voltage and having two other components whose resultant is in quadrature with its phase voltage or voltage to neutral. As the system shown is symmetrical it follows that the phase windings 19 and 20 also have induced therein voltages whose components bear the same relation to their main circuit conductor voltage as exists for the voltage induced in the phase winding 21.

By operating the common driving mechanism 28 for the adjusters 22, 23 and 24 the voltages of the windings 13, 14 and 15 are simultaneously and equally adjusted thereby to adjust the in-phase component of the regulating voltage. Similarly, operation of the common driving mechanism 29 for the ratio adjusters 25, 26 and 27 simultaneously and equally adjusts the effective voltages of the windings 10, 11 and 12 thereby simultaneously and equally adjusting the quadrature components of the regulating voltage.

Operation of the member 33 serves to reverse the switches 30, 31 and 32 from their illustrated position to the opposite position so as to reverse the effective voltages of the windings 10, 11 and 12. In this manner the quadrature component of the regulating voltage may be either a leading voltage or a lagging voltage. In a like manner operation of the member 37 throws the switches 34, 35 and 36 from their illustrated positions to their opposite positions so as to reverse the effective voltages of the windings 13, 14 and 15. In this manner the in-phase component of the regulating voltage may be either a boosting voltage or a bucking voltage.

Fig. 5 differs from Fig. 1 in that the phase windings 7, 8 and 9 of the primary winding 3 of the exciting transformer 1 are Y connected instead of delta connected. This reverses the phase relation of the delta windings 10, 11 and 12 and the remaining windings 13, 14 and 15 with respect to the line-to-neutral voltages of the main circuit I, II and III. In other words, the voltages of the delta-connected windings 10, 11 and 12 now produce the in-phase components of the regulating voltage instead of the quadrature components as in Figs. 1 and 2 and the voltages of the windings 13, 14 and 15 combine in pairs to produce the quadrature components of the regulating voltage.

While the ratio adjusters and reversing switches have been omitted from Fig. 5, it will be understood that these may be employed in a manner similar to that shown in Fig. 2 if desired.

Fig. 6 shows one form of physical arrangement of the phase windings 10, 11, 12, 13, 14 and 15 on a three-legged magnetic core 41. Although these six windings have previously been considered as constituting the secondary winding 4 of the exciting transformer 1 it should be understood that my invention is not limited to such use of these six windings and that their output circuit may supply directly the regulating voltage having the relatively adjustable in-phase and quadrature components. Furthermore, they do not necessarily constitute the secondary winding of a transformer which is excited by another winding and they may equally well be considered to constitute an autotransformer in which the necessary excitation is provided by connecting a three-phase supply circuit to corresponding points in three corresponding windings on the different legs. This figure shows more clearly the physical relationship between the delta-connected windings 10, 11 and 12 on the one hand and the remaining windings 13, 14 and 15 on the other hand. Thus, although the winding 14 is on the same leg with 10 it is connected through the reversing switch 35 to the corner of the delta formed by the interconnection of the phase windings 11 and 12 which are on the remaining two legs and as will be seen the same is also true for the windings 13 and 14.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of my invention.

What I claim as new and desire to secure by Letters Patent of the United States is:

1. In a three-phase regulating transformer, a three-legged core, two windings mounted on each leg of said core, three of said windings on different legs being delta connected, a terminal of each of the remaining windings being connected to a different corner of the delta, separate tap changing means for varying the effective turns of each of said windings and a three-phase circuit connected to said remaining windings.

2. In a three-phase regulating transformer, a three-legged core, two windings mounted on each leg of said core, three of said windings on different legs being delta connected, a terminal of each of the remaining windings being connected to the corner of the delta formed by the two delta phase windings which are on the remaining two legs from the one on which each said remaining winding is mounted, separate tap changing means for varying the effective turns of each of said windings and a three-phase circuit connected to said remaining windings.

3. In a three-phase regulating transformer, a three-legged core, two windings mounted on each leg of said core, three of said windings on different legs being delta connected, a terminal of each of the remaining windings being connected to a different corner of the delta, a three-phase circuit connected to said remaining windings, and means for reversing the voltages of said delta-connected windings.

4. In a three-phase regulating transformer, a three-legged core, two windings mounted on each leg of said core, three of said windings on different legs being delta connected, a terminal of each of the remaining windings being connected to a different corner of the delta, a three-phase circuit connected to said remaining windings, and means for reversing the voltages of said remaining windings.

5. In a three-phase regulating transformer, a three-legged core, two windings mounted on each leg of said core, three of said windings on different legs being delta connected, a terminal of each of the remaining windings being connected to a different corner of the delta, a three-phase circuit connected to said remaining windings, and means for varying the effective turns of said delta-connected windings.

6. In a three-phase regulating transformer, a three-legged core, two windings mounted on each leg of said core, three of said windings on different legs being delta connected, a terminal of each of the remaining windings being connected to a different corner of the delta, a three-phase circuit connected to said remaining windings, and means for varying the effective turns of said remaining windings.

7. A polyphase transformer comprising, in combination, three windings per phase, one winding of each phase being interconnected to form a symmetrical polyphase winding, individual tap-changing means associated with each of the other windings for varying their effective turns, one of said other windings per phase being interconnected through its tap-changing means to form a symmetrical closed mesh connection, means for simultaneously operating the tap-changing means of the winding forming said mesh connection, the remaining windings being connected symmetrically to the corners of said mesh connection, and means for simultaneously operating the tap-changing means associated with said remaining windings.

8. A polyphase transformer including, in combination, at least two windings per phase and at least one terminal per phase, one winding per phase being interconnected to form a symmetrical closed mesh connection, the other windings being connected symmetrically between said terminals and the corners of said mesh connection, means for simultaneously and equally varying the effective voltage of the windings constituting said mesh connection, and means for simultaneously and equally varying the effective voltage of the other windings.

ZOLTAN O. ST. PALLEY.